United States Patent Office 3,424,136
Patented Jan. 28, 1969

3,424,136
INTAKE SYSTEM FOR ROTARY PISTON
INTERNAL COMBUSTION ENGINE
Yoshitsugu Hamada, Nagahama-shi, Japan, assignor to
Yanmar Diesel Engine Co., Ltd., Osaka, Japan, a corporation of Japan
Filed Nov. 4, 1966, Ser. No. 592,065
Claims priority, application Japan, Nov. 10, 1965,
40/90,767
U.S. Cl. 123—8                        2 Claims
Int. Cl. F02b 53/06, 37/00; F02m 7/00

ABSTRACT OF THE DISCLOSURE

An intake system for a rotary piston internal combustion engine comprising a main intake port, an auxiliary intake port and a slide valve in an intake passage communicating with both ports. The slide valve is spring biased to automatically control the flow of fresh gas to the ports in response to a variation in the pressure of the gas in the intake passage.

---

Figure 1:
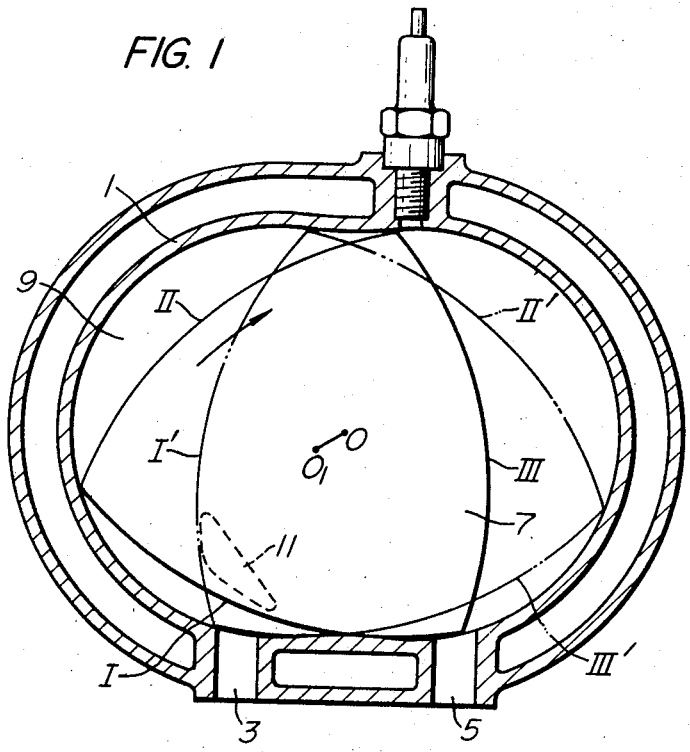

This invention relates to intake systems for rotary piston internal combustion engines and more particularly for those of the type including a housing having an epitrochoidal inner surface, end covers secured to the opposite ends of said housing, an engine shaft extending through said housing and said end covers axially thereof and including an eccentric portion between said end covers, and a generally triangular piston mounted on said eccentric portion of said engine shaft for rotation relative thereto and in the same direction as the latter at a revolution ratio of 1 to 3 with the apex portions of said piston held in sliding engagement with the epitrochoidal inner surface of said housing.

Conventional rotary piston internal combustion engines of the type described generally have an intake port for sucking a fresh charge and an exhaust port for discharging combustion gases, both formed in the epitrochoidal peripheral wall of the engine housing. Also, these engines have a fourphase cycle of operation, which includes a so-called overlap period in which the intake and exhaust ports are placed in communication with each other through one of the working chambers of the engine, which period including a final portion of the exhaust stroke and an initial portion of the following or intake stroke. In this regard, the rotary piston engines are similar to the four-stroke cycle reciprocating engines having poppet type intake and exhaust valves. With reciprocating engines, however, the opening degree of both the intake and exhaust valves during the overlap period is limited because of the relatively gentle opening and closing movement of the cam-operated valves. In contrast to this, with rotary piston engines both the intake and exhaust ports are held fully open during the most part of the overlap period because of the rapidity with which they are opened and closed. This has an advantageous effect of giving a higher output, making possible highly efficient utilization of the intake and exhaust pipe effects during high speed operation, but is undesirable for the idling of the engine in which the carburetor throttling valve is opened to only a limited extent. The reason for this is that as the pressure in the intake pipe is reduced the exhaust gases during the overlap period flows through the working chamber into the intake pipe so that the fuel-air mixture formed therein through the carburetor is diluted to a substantial extent. The mixture thus diluted with the exhaust gases naturally burns only slowly and in extreme cases misfiring occurs despite the ignition effect of electric sparks. To summarize, with rotary piston engines having intake and exhaust ports formed in their epitrochoidal peripheral wall of their engine casing, misfiring often takes place during idling of the engine to such an extent as to make any stable operation practically impossible though they can give high outputs as desired during highspeed operation with a full-open throttling.

The present invention has for its object to obviate the above disadvantages and, to attain this objective, proposes to arrange, in addition to the intake port conventionally formed in the epitrochoidal housing wall, an auxiliary intake port in the housing wall or in one of the end covers of the engine in a manner such as to cause no or, if any, only an extremely limited overlap period relative to the exhaust port. As will be described in detail hereinafter, these ports are controlled in operation so that during idling of the engine, only the auxiliary intake port is opened with the main intake port held closed to obviate any misfiring due to the overlapping between the intake and exhaust ports while, when the carburetor throttling valve is in full-open position, both the main and auxiliary intake ports are fully opened to obtain a desired higher output.

Figure 2:
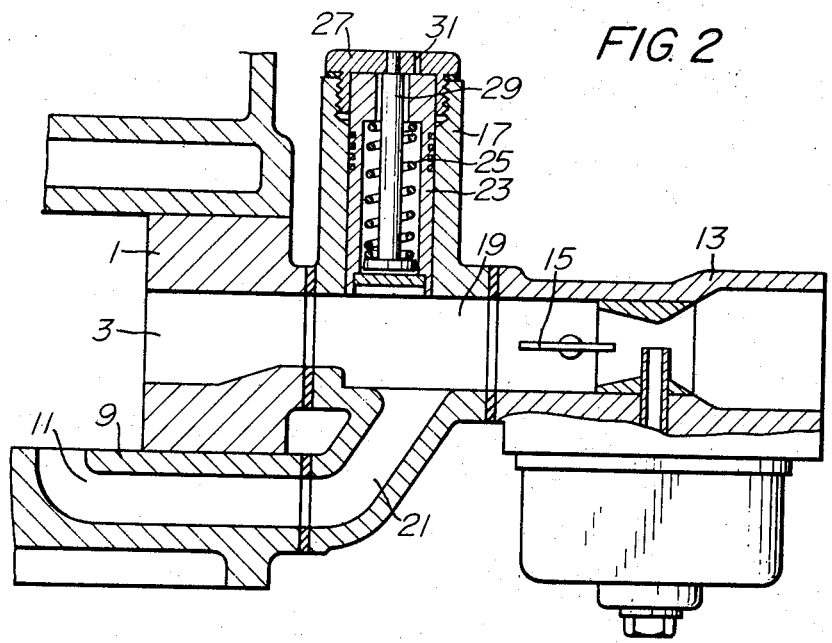
Figure 3:
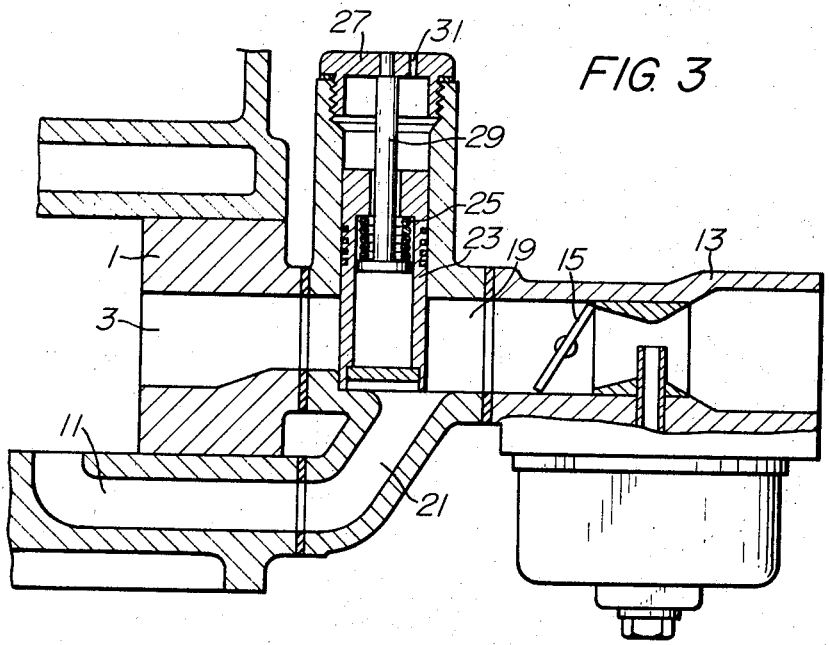

For better understanding of the present invention, description will now be made with reference to the accompanying drawings, in which:

FIG. 1 schematically illustrates a rotary piston internal combustion engine embodying the present invention;

FIG. 2 is a fragmentary longitudinal cross-sectional view of the rotary piston engine, taken through the carburetor device; and FIG. 3 is a view similar to FIG. 2 illustrating the engine during idling operation.

Referring first to FIG. 1, reference numeral 1 indicates the engine housing having an epitrochoidal inner surface and in which an intake and an exhaust port 3 and 5 are formed. A piston 7 is mounted in the housing for planetary rotation about the axis of the engine shaft with its rotation to effect a fourphase cycle of operation, including suction of a fuel-air mixture through the intake port, compression of the mixture, explosive expansion due to its combustion and discharging of combustion gases through the exhaust port 5.

An auxiliary intake port 11 is formed in one of the end covers 9 covering the housing 1 at its opposite ends. The auxiliary intake port 11 plays the same role of sucking the fuel-air mixture as the main intake port formed in the housing wall but differs more or less therefrom in character, as will be described below.

In FIG. 1, the piston 7 is shown in its position with one of the working chambers defined by the piston side I at its initial stage of suction stroke and still in communication with the exhaust port 5. Thus, at the illustrated instant, the working chamber is in the so-called overlap period with the main intake port 3 and exhaust port 5 communicating with each other. However, the auxiliary intake port 11 formed in the end cover 9 is still closed at this instant and is not opened until the exhaust port 5 is closed with respect to the working chamber. In other words, the auxiliary intake port 11 is never placed in communication with the exhaust port during the cycle of operation of the engine.

During the suction stroke, the pressure in the main intake port is obviously negative. Therefore, at the initial stage of the stroke, exhaust gases are led into the main intake port, which at this time is in communication with the exhaust port, to dilute the fuel-air mixture in the main intake port. In cases where the throttling valve in the carburetor is in its full-open position during the full-power operation of the engine, the negative pressure in the intake port and resulting inflow of the exhaust gases therein are limited so that their diluting effect is negligible with no substantial influence upon the engine performance. On the other hand, during idling of the engine when the carburetor throttling valve is in nearly closed position, the negative pressure in the intake port is substantial and, unless appropriate measures be taken, the fuel-air mixture therein would be diluted to a considerable extent by the exhaust gases, sometimes making impossible the combustion of the fuel-air mixture in the explosion stroke of the engine. This overlapping of the intake and exhaust ports would apparently impair the smoothness of the idling operation of the engine though it may be effective to increase the engine output during highspeed operation.

However, if the auxiliary intake port is solely employed for suction of the fuel-air mixture, any dilution of the latter by the exhaust gases would be prevented since the auxiliary intake port is never placed in communication with the exhaust port and a smooth idling operation might be obtained. On the other hand the lack of overlapping of the intake and exhaust ports would result in reduction in engine output during highspeed operation.

It has been found that these inconveniences in engine operation can be avoided by controlling the main and auxiliary intake ports in a manner so that for idling operation with the carburetor throttling valve nearly closed only the auxiliary intake port is placed in use while for operation with the throttling valve fully opened both main and auxiliary intake ports are brought to use.

Referring to FIG. 2, reference numeral 13 indicates a carburetor having a throttling valve 15, and 17 indicates a port controlling device including a passage 19 which interconnects the carburetor 13 and the main intake port 3. The carburetor 13 is also connected to the auxiliary intake port 11 by way of a passage 21. A slide piston 23 is built in the body of the port controlling device 17 and is normally biased upwardly by a spring 25, which is supported at one end on a rod 29, which in turn is secured to a cap 27 threadably fixed to the top of the body 17. A vent aperture 31 is formed in the cap 27 to communicate the top surface of the piston 23 with the exterior.

During full-power operation of the engine, when the carburetor throttling valve 15 is fully open, the negative pressure in the suction passages is limited, at most −0.1 atm., and thus the piston load corresponding to the pressure difference between the top and bottom surfaces of the piston 23 is also limited so that the latter is held in its upper position shown in FIG. 2 under the bias of the spring 25 to maintain both main and auxiliary intake ports in communication with the carbuertor, allowing the fuel-air mixture formed therein to be sucked into the working chamber through both main and auxiliary intake ports.

Reference will next be made to FIG. 3, which illustrates the engine in idling operation with the carburetor throttling valve nearly full-closed. In this case, the negative pressure in the passage 19 is held substantial, of the order of −0.5 atm. and the pressure difference between the top and bottom surfaces of the piston 23 overcomes the bias of the spring 25 causing the piston 23 to descend to close off the main intake port 3 from the passage 19, as shown. As the result, the fuel-air mixture formed in the carburetor is sucked into the working chambers of the engine solely through the passage 21 and auxiliary intake port 11.

By this means, it will be appreciated that by opening and closing the throttling valve of the carburetor, the intake port can be opened and closed in an automatic fashion to obtain a satisfactory engine performance both in idling and in full-power operation.

What is claimed is:

1. In a rotary piston internal combustion engine of the type including a housing having an epitrochoidal inner surface, end covers secured to the opposite ends of said housing, an engine shaft extending through said housing and end covers axially thereof and including an eccentric portion between said end covers, and a generally triangular piston mounted on said eccentric portion of said engine shaft for rotation relative thereto and in the same direction as the latter at a revolution ratio of 1 to 3 with the apex portions of said piston held in sliding engagement with the epitrochoidal inner surface of said housing, an intake system comprising a main intake port formed in said housing, an auxiliary intake port formed in said housing, an intake pipe communicating with both said ports, a piston adjacent said intake pipe and mounted to move therein in response to a variation in the negative pressure of gas in the intake pipe for automatically intercepting said communication between the intake pipe and the main intake port, and spring means normally holding said piston at an inoperative position against the negative pressure acting thereon.

2. In a rotary piston internal combustion engine of the type including a housing having an epitrochoidal inner surface, end covers secured to the opposite ends of said housing, an engine shaft extending through said housing and end covers axially thereof and including an eccentric portion between said end covers, and a generally triangular piston mounted on said eccentric portion of said engine shaft for rotation relative thereto and in the same direction as the latter at a revolution ratio of 1 to 3 with the apex portions of said piston held in sliding engagement with the epitrochoidal inner surface of said housing, an intake system comprising a main intake port formed in said housing, an auxiliary intake port formed in one of said end covers, an intake pipe communicating with both said ports, a piston adjacent said intake pipe and mounted to move therein in response to a variation in the negative pressure of gas in the intake pipe for automatically intercepting said communication between the intake pipe and the main intake port, and spring means normally holding said piston at an inoperative position against the negative pressure acting thereon.

References Cited

UNITED STATES PATENTS 3,347,213    10/1967    Froede _____ 123—8

JULIUS E. WEST, *Primary Examiner.*

DOUGLAS HART, *Assistant Examiner.*

U.S. Cl. X.R.

123—119, 198